(12) United States Patent
Chen et al.

(10) Patent No.: US 8,479,242 B1
(45) Date of Patent: Jul. 2, 2013

(54) VIDEO STORAGE AND DISTRIBUTION

(75) Inventors: Steven Chen, San Francisco, CA (US);
 Michael Solomon, Palo Alto, CA (US);
 Dwipal Desai, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 256 days.

(21) Appl. No.: 11/744,820

(22) Filed: May 4, 2007

Related U.S. Application Data (60) Provisional application No. 60/798,007, filed on May 4, 2006.

(51) Int. Cl.
 *H04N 7/173* (2011.01)
(52) U.S. Cl.
 USPC .................... 725/96; 725/93; 725/94; 725/95
(58) Field of Classification Search
 None
 See application file for complete search history.

(56) References Cited

U.S. PATENT DOCUMENTS

| | | | |
|---|---|---|---|
| 5,956,716 A | | 9/1999 | Kenner et al. |
| 6,223,205 B1* | | 4/2001 | Harchol-Balter et al. ..... 718/105 |
| 6,564,380 B1 | | 5/2003 | Murphy |
| 6,774,926 B1* | | 8/2004 | Ellis et al. .................. 348/14.01 |
| 6,801,576 B1* | | 10/2004 | Haldeman et al. ....... 375/240.29 |
| 2002/0049977 A1* | | 4/2002 | Miller et al. .................... 725/82 |
| 2002/0124137 A1* | | 9/2002 | Ulrich et al. .................. 711/113 |
| 2003/0055971 A1* | | 3/2003 | Menon ........................... 709/226 |
| 2005/0028206 A1* | | 2/2005 | Cameron et al. ................ 725/46 |
| 2005/0033855 A1* | | 2/2005 | Moradi et al. ................ 709/231 |
| 2006/0259589 A1* | | 11/2006 | Lerman et al. ................ 709/219 |

\* cited by examiner

*Primary Examiner* — Brian Pendleton
*Assistant Examiner* — Cai Chen
(74) *Attorney, Agent, or Firm* — Fenwick & West LLP (57) ABSTRACT

Receiving and sending videos over a network such as the Internet. In one implementation, users upload videos to a web site in a variety of formats. The videos are transcoded and other users can view the videos by indicating their desire to do so on the site. In one embodiment, a video is streamed to the watching user using Flash and the user watches the video via a Flash player, for example, a flash player in his browser.

10 Claims, 9 Drawing Sheets

310
Receive load balancing data, including throughput data, from each of a plurality of servers on a service provider network

320
Compare the throughput data for each server against a threshold

330
Determining how to redistribute videos across the servers on the network to balance the load across all of the servers

340
Transmitting redistribution requests to the servers with throughput greater than the threshold identifying at least one video to transfer and the server to which the video should be transferred.

| master_server_id | slave_server_id | time_created | flags |
|---|---|---|---|
| 1 | 2 | 0 | 0 |
| 2 | 1 | 0 | 0 |
| 3 | 4 | 0 | 0 |
| 4 | 3 | 0 | 0 |

| cluster_id | server_id | status (UP/DOWN) | hostname | upload_status (ACCEPT/DENY) | mount_points |
|---|---|---|---|---|---|
| 1 | 1 | U | v1 | 'A' | 2 |
| 1 | 2 | U | v2 | 'A' | 2 |
| 2 | 3 | U | v3 | 'D' | 2 |
| 2 | 4 | U | v4 | 'A' | 2 |

| video_id | status |
|---|---|
| 1 | Processed |
| 2 | Processed |
| 3 | Processed |
| 4 | Replicating |
| 5 | Pending |
|  |  |
|  |  |

| video_id | cluster_id | origin_server_id |
|---|---|---|
| 1 | 1 | 1 |
| 2 | 2 | 3 |
| 3 | 2 | 4 |
| 4 | 1 | 1 |
| 5 | 1 | 2 |
|  |  |  |

| video_id | server_id | origin_server_id |
|---|---|---|
| 1 | 1, 2 | 1 |
| 2 | 3, 4 | 3 |
| 3 | 3, 4 | 4 |
| 4 | 1, 2 | 1 |
| 5 | 1, 2 | 2 |
| | | |

Figure 8B

VIDEO STORAGE AND DISTRIBUTION

This application claims priority under 35 U.S.C. §119(e) from U.S. Provisional Application No. 60/798,007 of Chen et al. filed May 4, 2006, which is herein incorporated by reference in its entirety.

TECHNICAL FIELD

The present invention relates generally to Internet and video technologies, and more particularly, to receiving and distributing videos over a network, such as the Internet.

BACKGROUND OF THE INVENTION

As the use of the Internet continues to increase, users are being offered access to greater levels of bandwidth than ever before. Users have taken advantage of the increased bandwidth to access and share audio files and digital photos that require large amounts of bandwidth. Web sites have taken advantage of the increased bandwidth by offering more video content to users.

As the size and cost of devices capable of capturing and editing video continues to decrease, users are also capturing more video content than ever before. As the bandwidth available to these users continues to increase, users want to share their captured video with others. However, streaming or otherwise distributing content to users over a network, such as the Internet, may be difficult for individual users. There are a number of technical obstacles that must be overcome to ensure that videos may be shared with other users efficiently. Furthermore, it may be difficult for individual users to attract other users to their content. As a result, services are needed to assist help users distribute their video content over a network, such as the Internet.

SUMMARY

The described embodiments of the invention is a system and method for receiving and sending videos over a network such as the Internet. In one implementation, users upload videos to a web site in a variety of formats. The videos are transcoded and other users can view the videos by indicating their desire to do so on the site. In one embodiment, a video is streamed to the watching user using Flash and the user watches the video via a flash player, for example, a flash player in his browser.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF EMBODIMENTS

Methods, systems and apparatuses for receiving videos from various users over a network, transcoding the videos, storing the videos, streaming the videos to users over a network and load balancing the videos across multiple servers of a service provider network are described. For purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of mediums, including software, hardware, or firmware, or a combination thereof. Accordingly, the figures described below are illustrative of specific embodiments of the invention and are meant to avoid obscuring the invention.

Reference in the specification to "one embodiment," "a preferred embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

I. Overview

Figure 1:
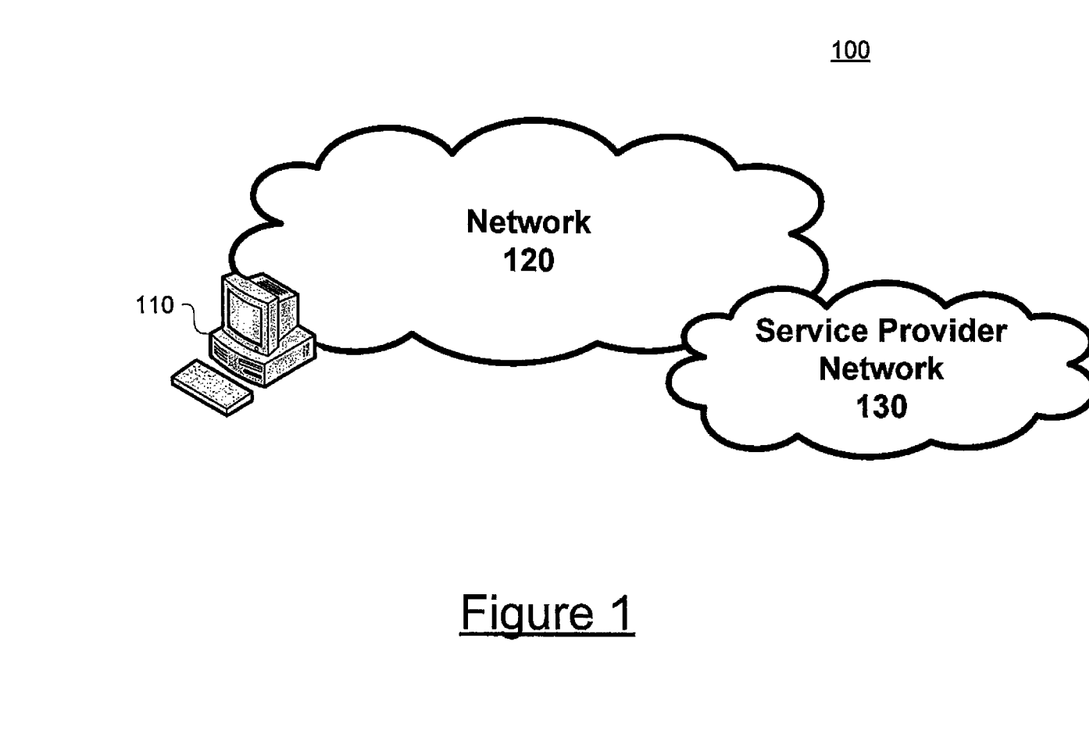
FIG. 1 is a diagram of a network environment for uploading and streaming videos between a user computer and a service provider network according to one embodiment of the invention.

The present invention relates to a service that receives videos uploaded by users over a network, stores the videos on a service provider network and distributes the videos to other users over a network, such as the Internet. FIG. 1 illustrates a network environment 100 in which users may upload a video to a service provider network or stream a video stored on the service provider network for display on the user's computer. FIG. 1 includes a user computer 110 and a service provider network 130 connected to each other over a network 120.

One skilled in the art will recognize that there are a number of ways that devices may connect to a network, including but not limited to, telephone lines, fiber optic cable and wireless communication technologies.

Service provider network 130 is comprised of one or more servers capable of receiving and providing access to videos over a network, such as the Internet. The server provider network 130 may be comprised of one or more servers located at a single physical location or may be comprised of multiple servers located at different physical locations. The servers may be owned and managed by the service provider or may be owned by a third party from whom the service provider leases the servers. The lessee has control over the server but does not physically own or manage the facility where the server is located.

Figure 2:
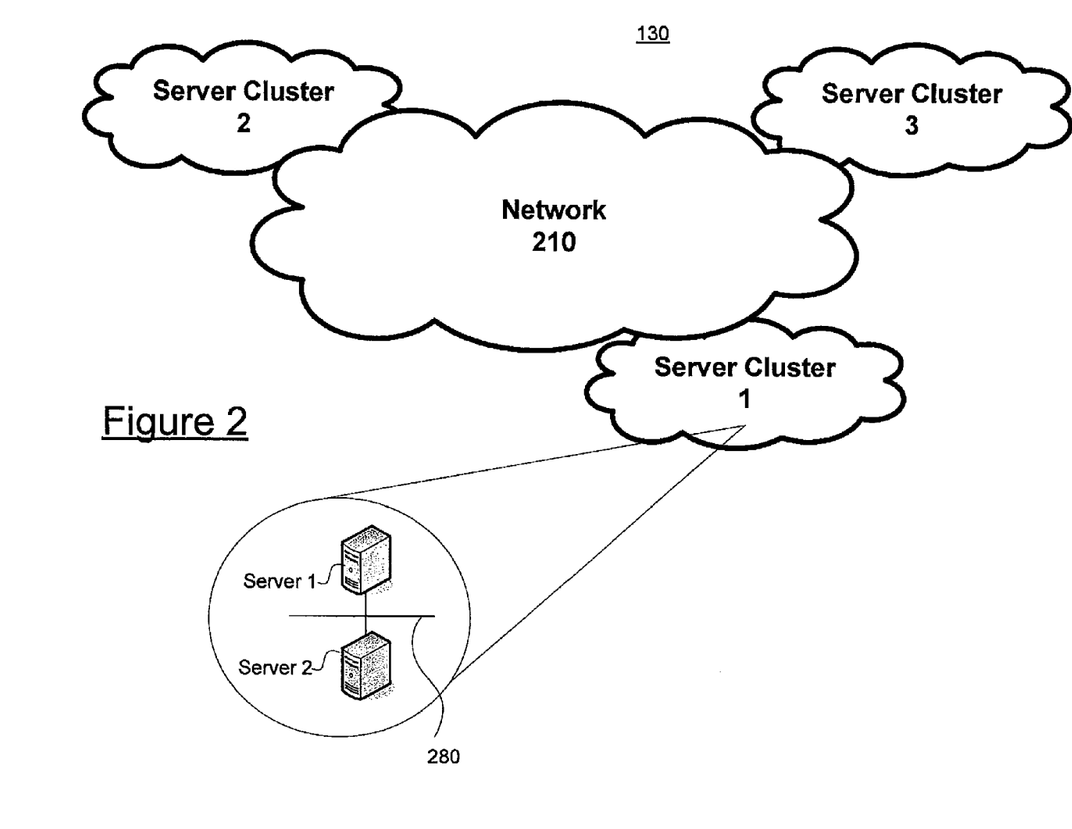
FIG. 2 is a diagram of a service provider network according to one embodiment of the invention.

FIG. 2 illustrates an example service provider network 130 according to the present invention comprised of multiple servers grouped into server clusters. In this example, service provider network 130 is comprised of three server clusters, labeled 1,2 and 3, connected to each other over a network 210. In one embodiment, a server cluster comprises one or more servers grouped together. The servers that make up a cluster may be located at a single physical or geographical location or may be located at different locations. In one embodiment, a server cluster comprises one or more servers that host the same content (e.g. the same videos). One skilled in the art will recognize that the servers that make up a cluster and the server clusters themselves may be connected using any network technology including a private network or a public network such as the Internet.

In an embodiment, each server cluster comprises one or more servers capable of receiving, storing, and streaming the videos to users over the network. Service provider network 130 may also comprise one or more servers used to manage the service provider network and/or provide load balancing and load redistribution as will be discussed further herein. Further, the server clusters may comprise other networked devices, such as storage devices and/or databases, which provide additional storage and redundancy for the service provider network.

FIG. 2 includes an expanded view of server cluster 1 to illustrate one possible configuration of the servers within the cluster. This figure is for illustration purposes only and is not intended to limit the scope of the present invention. In this example configuration, server cluster 1 comprises two servers, labeled server 1 and server 2. Each server is connected to each other and network 210 over a local network connection 280, such as Ethernet.

Figure 5:
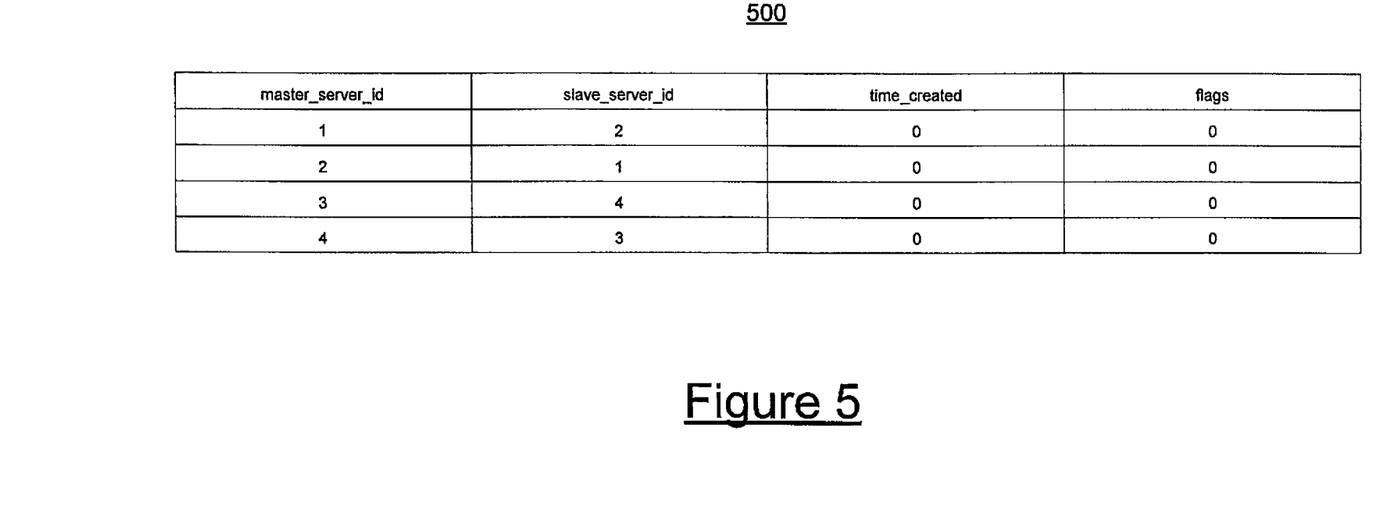
FIG. 5 is a slave server lookup table 500 according to one embodiment of the invention.

In one embodiment, the servers are configured in a master-slave configuration to provide redundancy and load balancing efficiency. Each server may act as both a master and a slave and has access to one or more servers that act as slaves when the server is functioning as a master server. FIG. 5 is an example slave server lookup table 500 that defines the master server relationships between the servers of cluster 1. In this example, when server 1 when is functioning as a master server, its slave within cluster 1 is server 2. Similarly, when server 2 is functioning as a master server, its slave within cluster 1 is server 1. One skilled in the art will recognize that the invention is not limited to the configuration of table 500. For example, each master may have multiple slave servers. In addition, the slave servers for a master server do not need to be in the same server cluster. The slaves may be distributed throughout the service provider network 130.

II. Uploading Videos

In one embodiment, the service provider accepts video submissions from users over the Internet. Users may upload videos to the service provider network 130 in order to share them with other users over the Internet or other network. The videos may include home videos, independent films, commercial films, television shows, or any other video content that a user believes other users might be interested in viewing. In addition to uploading videos, users may also search the videos stored on the service provider network 130 and request videos they are interested in viewing. The service provider network 130 streams or otherwise downloads the videos from the service provider network 130 to the user's computer 110 over network 120.

In one embodiment, users upload videos through an interface provided by the service provider. For example, the user may access a web page associated with the service provider that comprises an interface that allows users to specify a video stored on the user's computer 110 the user would like to upload to the service provider network 130. The video is transferred from the user's computer 110 to the service provider over the network 120.

Figure 6:
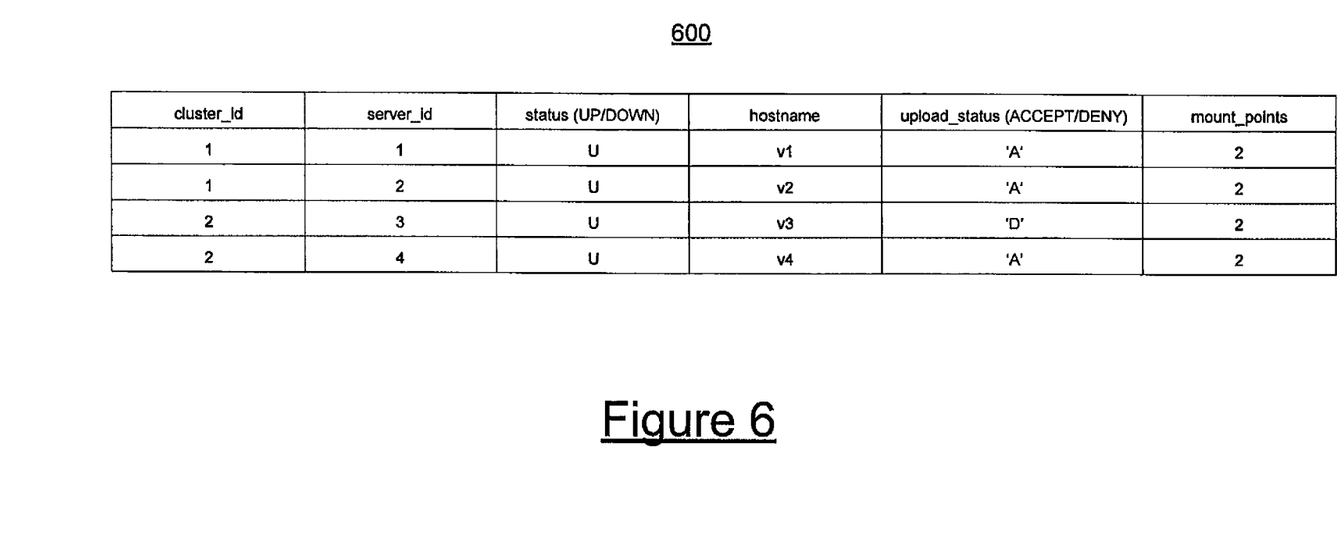
FIG. 6 is a cluster lookup table 600 according to one embodiment of the invention.

When a video upload request is received, one of the servers within the service provider network 130 is selected to function as the master server for receiving the video. In one embodiment, the master server is selected from a server lookup table. FIG. 6 illustrates an example cluster lookup table 600 that identifies each of the servers within the service provider network 130. Table 600 includes fields for the server ID for each server, the cluster in which the server is located, the status of the server, the hostname of the server, the upload status of each server and the number of mount points (e.g. hard drives) within each cluster, In one embodiment, a master server whose status is Up (indicating that the server is functioning properly) and has an upload status set to Accept is randomly selected from Table 600 to receive the uploaded video. For example, servers 1,2 and 4 in table 600 may be selected as the master server to handle an upload request. Server 3 is not available to handle the upload request since its status is set to Deny uploads.

As illustrated in table 600, each server may comprise multiple mount points to the server's hard drive. In one embodiment, the mount point to which the video should be stored within the selected server may be determined by looking up the number of mount points for the selected server within table 600. The actual mount point to which the video is stored may be selected according to the function mod(video ID, mount points) which returns the remainder of the video ID divided by the number of mount points. In the example of table 600, each server has 2 mount points, thus the mod function will return either a 0 or a 1 as the remainder. Depending on the remainder, either mount point 0 or mount point 1 is selected as the mount point within the selected server to which the video is stored.

Figure 7:
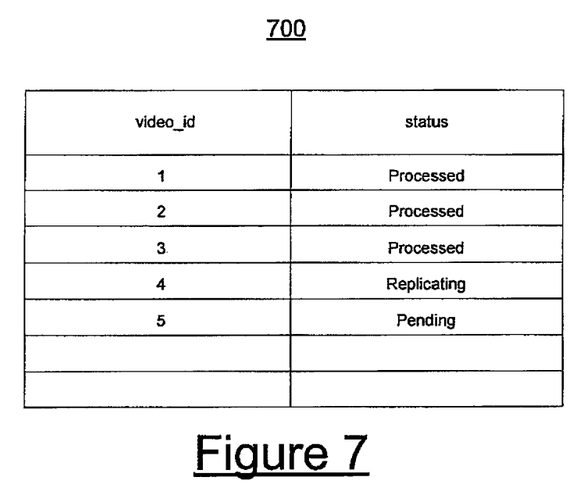
FIG. 7 is a video lookup table 700 according to one embodiment of the invention.

In one embodiment, the selected master server creates a new entry in a video table that monitors the status of each video within the service provider network 130. FIG. 7 illustrates an example video table 700 that comprises a video ID and the current status for each video stored on service provider network 130. When the new entry is created, the master server assigns a unique video ID to the video and sets the status to "Pending." In another embodiment, video table 700 may include additional fields, including but not limited to fields for the user ID of the user who uploaded the video, the time the uploaded video was processed, the time the transcoded video was created, the filename of the video, the file type of the video and the file size of the video. [0028] In one embodiment, the master server receives the uploaded video in its native format over network 120 and stores the video to its internal hard drive or other storage medium. In an embodiment, the master server transcodes the video into a common format as will he discussed further herein and stores the transcoded video to its internal hard drive or other storage medium.

In one embodiment, following the transcoding of the video, the master server changes the status for the uploaded video within video table 700 to "Replicating" and stores the transcoded video to one or more slave servers. In one embodiment, the master determines which servers are its slaves by performing a lookup within a slave server lookup table. FIG. 5 is an example slave server lookup table 500 that maps a master server ID to a slave server ID. In this embodiment, there is only one slave server per master server. However, in an alternative embodiment, each master server could have multiple slave servers associated with the master. In the alternative embodiment, lookup table 500 would include multiple server IDS in the slave server ID field. Slave server table 500 may also comprise additional fields such as a flags field and time created field. The time created field may be used to track when each of the slave servers came online for the first time. For example, if servers are acquired in large batches, it is useful to know when a batch of video servers came online for debugging and diagnostic purposes. One skilled in the art will recognize that there are a number of potential uses for the flags field.

In one embodiment, after identifying one or more slave server IDS associated with the master server, the master server performs a lookup in the cluster lookup table 600 using the server IDS of its slaves to determine the status and hostname for each of its slave servers. For each of its slave servers with a status of Up, the master server transfers a copy of the transcoded video to the hostname of the slave server. As a result, the video is replicated across multiple servers in the service provider network 130. This provides redundancy in case of a failure in the master server the slave server retains a copy of the video. This configuration also provides load balancing in that multiple servers are capable of streaming or otherwise distributing the same video. By assigning incoming requests for the video equally across the multiple servers storing the video, the load associated with a given video is balanced across the multiple servers.

Figure 8A:
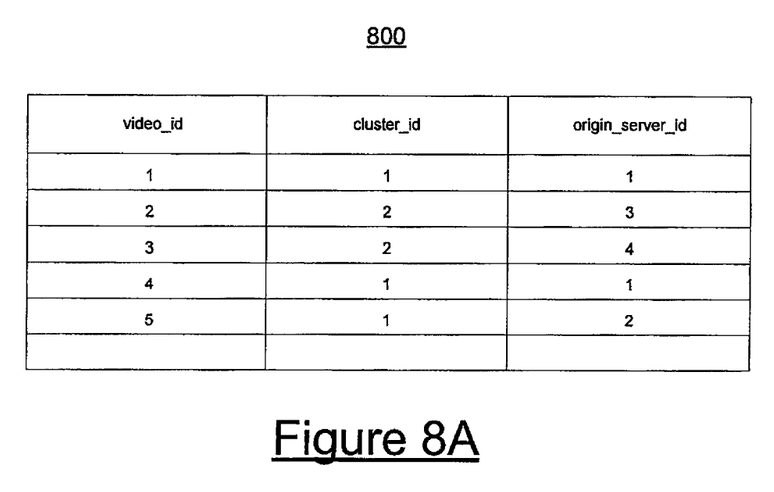
FIG. 8A is a video address lookup table 800 according to one embodiment of the invention.

In one embodiment, after the master server has replicated the transcoded video to its slave servers, the master server changes the status of the video in the video table 700 to "Processed." In addition, the master server creates a new entry in a video address table which maps the video ID of the video to the server(s) to which the video was uploaded. FIG. 8A illustrates an example video address lookup table 800 according to one embodiment of the invention. In this embodiment, when a video is uploaded to a master server, the video is replicated to each server within the same cluster as the master server. Video address lookup table 800 maps a unique video ID to the cluster ID of the cluster on which the video is stored and the server ID of the original server to which the video was uploaded.

Figure 8B:
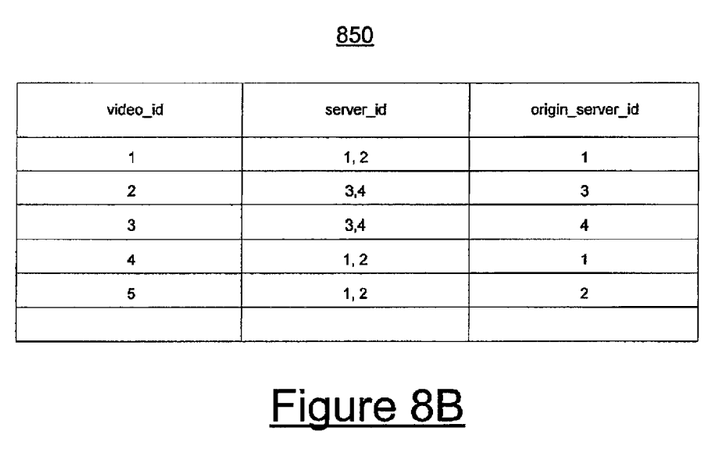
FIG. 8B is a video address lookup table 850 according to a second embodiment of the invention.

An alternative embodiment of the video address lookup table is illustrated in FIG. 8B. In the alternative embodiment, video address lookup table 850 maps each unique video ID to the server ID of the original server to which the video was uploaded and the server IDS of one or more servers on which the video is stored. In this embodiment, the video may be distributed across one or more servers throughout the service provider network 130.

In one embodiment, the original server ID is used in the case of a failure during the replication of a video from a master server to one c) r more slave servers to identify the videos that need to be replicated and the master server responsible for the replication. For example, in the event that the link between the master server and its slaves is severed during the replication of a video, the master server may perform a lookup in video table 700 to identify each video with a status of Replicating. For each of these videos, the master server performs a lookup into video address lookup table 800 (or video address lookup table 850) using the video ID of each video to identify the original server ID for each of the videos with a status of replicating. The master server reruns the replication process discussed above for each of the videos with an original server ID that matches the master server's ID.

III. Transcoding

One problem with accepting videos from a variety of sources is that there are a number of video formats that may have been used to encode the videos. Each video format requires a corresponding decoder for decoding the video data into raw video data that can be displayed on the user computer 110. However, few users will have access to all of the video decoders necessary to decode each video format. Thus, it is preferable to encode all of the uploaded videos into a common format so that the users can view all the videos streamed from the service provider network using a single video decoder.

In one embodiment of the invention, each uploaded video is transcoded from its native video encoding format (e.g. MPEG4, WMV, Motion PEG) to Macromedia's flash video format. This video format is well suited to streaming video over the Internet because it is compatible with a large number of web browsers. Thus, it provides a video format that can be viewed on a large number of user computers 110.

Figure 4:
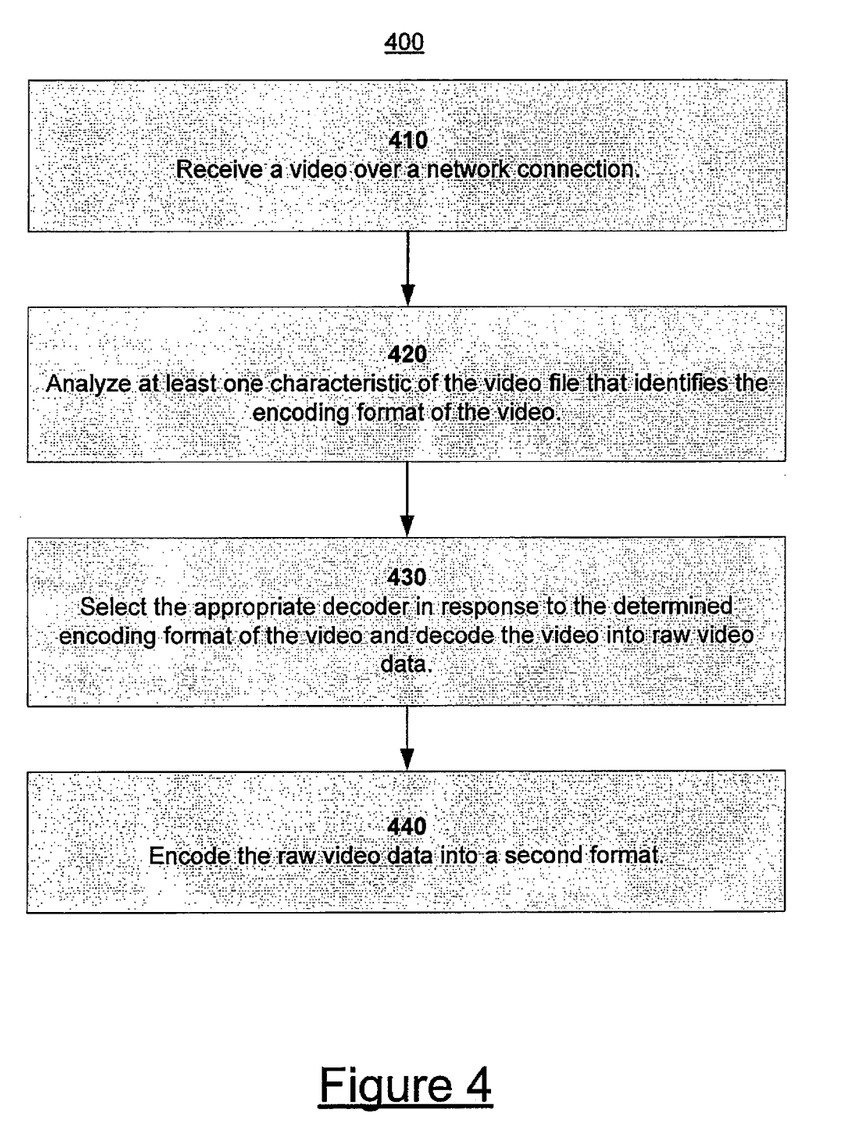
FIG. 4 is a flow chart of a method 400 for transcoding videos according to one embodiment of the invention.

In one embodiment, transcoding video involves decoding the video from its native encoding format into raw video data and then re-encoding the raw video data into a new video format. FIG. 4 is a flow chart of a method 400 for transcoding uploaded videos according to one embodiment of the invention. In step 410, a video is received by the server in its native video encoding format. For example, the server may receive the video from a user who uploaded the video to the server over a network, such as the Internet. The video format of the uploaded video may be one of a number of different video encoding formats currently in use.

In step 420, the server analyzes the video file to identify at least one characteristic of the video file that identifies the encoding format of the video. In one embodiment, the encoding video format may be determined by analyzing the file extension of the video and/or header information from the uploaded video file. For example, a video encoded in the MF'EG4 format may have a file extension of .mp4.

Alternatively, the server may parse one or more fields from the header of a video file that may be used to identify the format of the encoded video. For example, QuickTime is a video container format that is commonly used to encapsulate a video encoded in a given format. The format of the encoded video is not obvious based on the file extension of the file. However, the QuickTime container includes header fields that identify the encoding format of the video. In one embodiment, the video file may be parsed using a third-party software program, such as MEncoder, to parse the video file to extract various header fields and other information from the video file. Using the parsed header fields, such as a "sample description" field which identifies the encoding format of the video, the appropriate decoder for the video may be determined.

In step 430, the server selects the appropriate decoder in response to the determined encoding format of the uploaded video and decodes the uploaded video from its native encoding format into raw video data. In step 440, the decoded video data is passed to an encoder which encodes the video into a second format. In one embodiment, information parsed from the header(s) of the video file, such as the frame rate, aspect ratio, and length of the video, may also be passed to the encoder to aid in the encoding of the video into the second format.

In some instances, the selected decoder may not properly decode the video. This may be due to the device or software program that encoded the video inserting incorrect information into a particular header field used by the decoder to decode the video. In one embodiment, responsive to the decoder failing to decode the video properly, the characteristics of the video are analyzed to identify one or more characteristics that are potentially incorrect. For example, it may be known based on past experience that a particular video camera inserts the wrong frame rate in the header of video files that come from the camera or software program.

In one embodiment, an incorrect characteristic of the video is adjusted and the decoding process is tried again using the adjusted characteristic. For example, if the header that identifies a camera from which the video was recorded that is the known to insert an incorrect frame rate into the header of a video, the frame rate may be adjusted accordingly based on past experience. Alternatively, the characteristics may be adjusted in a trial and error approach. For example, if the frame rate parsed from a video file is way too high, such as 1,000 frames per second, through trial and error, different common frame rates may he applied until one is found which correctly decodes the video.

In one embodiment, there may be multiple potentially incorrect characteristics identified for a particular video. In this case, each potentially incorrect characteristic may suggest a different decoder or decoder setting that may need to be tried on a particular video. In one embodiment, the decoders and/or decoder settings may be ranked in order of likelihood of success and applied in the ranked order until the video is successfully decoded.

The decoded video data may be encoded into a second format using the corresponding encoder. In one embodiment, characteristics parsed from the native video file, including but not limited to the frame rate, aspect ratio, and the length of the video, may be used by the encoder during the encoding of the video into the new format. Although the video may have been properly decoded using these characteristics, they may comprise incorrect information as discussed above. The incorrect information may cause the encoding process to fail or take an unusually long amount of time to complete.

In one embodiment, the characteristics parsed from the video file may be analyzed as discussed previously to identify one or more characteristics that may potentially be incorrect. These characteristics may be adjusted through trial and error or based on previous experience as discussed above to try to come up with a set of characteristics that may be used by the encoder to properly encode the video.

While the above methods have been discussed with respect to identifying a video format, the methods are also applicable to identifying an audio format for transcoding audio from its native format to a second format. For example, the encoding format and the original parameters used for the encoding the audio, such as the sampling rate may be parsed from the header of a video or audio container file. The methods described above may be used to determine the native audio format and the encoding parameters which may be used when transcoding the audio from its native format to a new format.

Using the methods described above, audio and video may be transcoded in real time by the server without input from a user. This approach allows videos to be made available for streaming to other users almost immediately following the upload of the video.

IV. Accessing Videos

As discussed above, users may access videos from the service provider network 130 for display on the user's computer. In one embodiment, the requested video is streamed to the user's computer. However, the present invention is not limited to video streaming and may also apply to other forms of access including downloading videos from the service provider network for storage on the user's computer.

In one embodiment, users may request videos stored on the service provider network 130 through a web page provided by the service provider. For example, the service provider may provide a web page with links to various videos available from the service provider network 130. The videos presented to the user in the web page may be the results of a search query input by a user or simply a random selection of videos or the most popular videos for a given category. In one embodiment, each link includes the video ID associated with the video. The user requests a video by selecting (e.g. clicking) the link associated with the video. The video request sent from the user computer to the service provider network in response to the selection includes the unique video ID for the requested video.

In one embodiment, each request for a video received by the service provider network is directed to a master server within the service provider network 130. For example, the master server may be selected from cluster lookup table 600, which identifies each of the servers within the service provider network 130. In one embodiment, the master server may be randomly selected from those servers within lookup table 600 with a status set to Up.

In one embodiment, the master server decrypts the incoming video ID and uses the video ID to determine which cluster or server(s) on the service provider network 130 stores the video. For example, when using video address lookup table 800, the master server may perform a lookup into video address lookup table 800 using the requested video ID. The lookup returns the cluster ID of the cluster on which the video is stored. In this embodiment, the video is stored on each server of the cluster identified by the cluster ID. The master server may perform a lookup into cluster lookup table 600 to identify each of the servers within the cluster associated with the cluster ID. The master server selects one of the servers within the cluster randomly and determines the server's status. If the selected server's status is Up, the master server redirects the users request for the video to the selected server. If the server's status is Down, the master selects another server within the cluster and checks its status within table 600. The master continues this process until it redirects the video request to a functioning server within the cluster.

Upon receiving the redirected user request, the selected server starts streaming or otherwise distributing the requested video to the user's computer.

In an alternative embodiment where video address table 850 is used, the master server performs a lookup into table 850 using the decrypted video ID. The lookup returns the server IDS for one or more servers that store the requested video. The master server selects one of the servers from the list randomly and performs a lookup into cluster table 600 to determine the status of the server. If the selected server's status is Up, the master server redirects the user's request for the video to the selected server. If the server's status is Down, the master selects another server from the list and checks its status within table 600. The master continues this process until it redirects the video request to a functioning server within the cluster.

Upon receiving the redirected user request, the selected server starts streaming or otherwise distributing the requested video to the user's computer.

V. Load Distribution

In the embodiments described above, upload requests are assigned randomly to master servers. As a result, a first master server and its slave servers may store multiple popular videos that require a lot of bandwidth to stream to users while a second master server may store unpopular videos that are rarely streamed to users. Alternatively, the first master server may receive long videos while the second master receives very short clips that do not take long to stream to users. As a result, the first master server and its slaves may be utilizing significant resources while the second server and its slaves are essentially sitting idle.

To improve the performance of the service provider network 130, the bandwidth throughput and other resources of the servers may be analyzed and videos redistributed to balance the load across all of the servers of the service provider network 130. In one embodiment, each server within the service provider network 130 keeps track of the file size of each video stored on the server and the number of times the server distributed the video over a particular period of time, referred to as an adjustment time quanta (ATQ). For each server, the overall throughput of the server is also tracked over the ATQ. In one embodiment, a software program may run on each server to track the throughput of the server.

Figure 3:
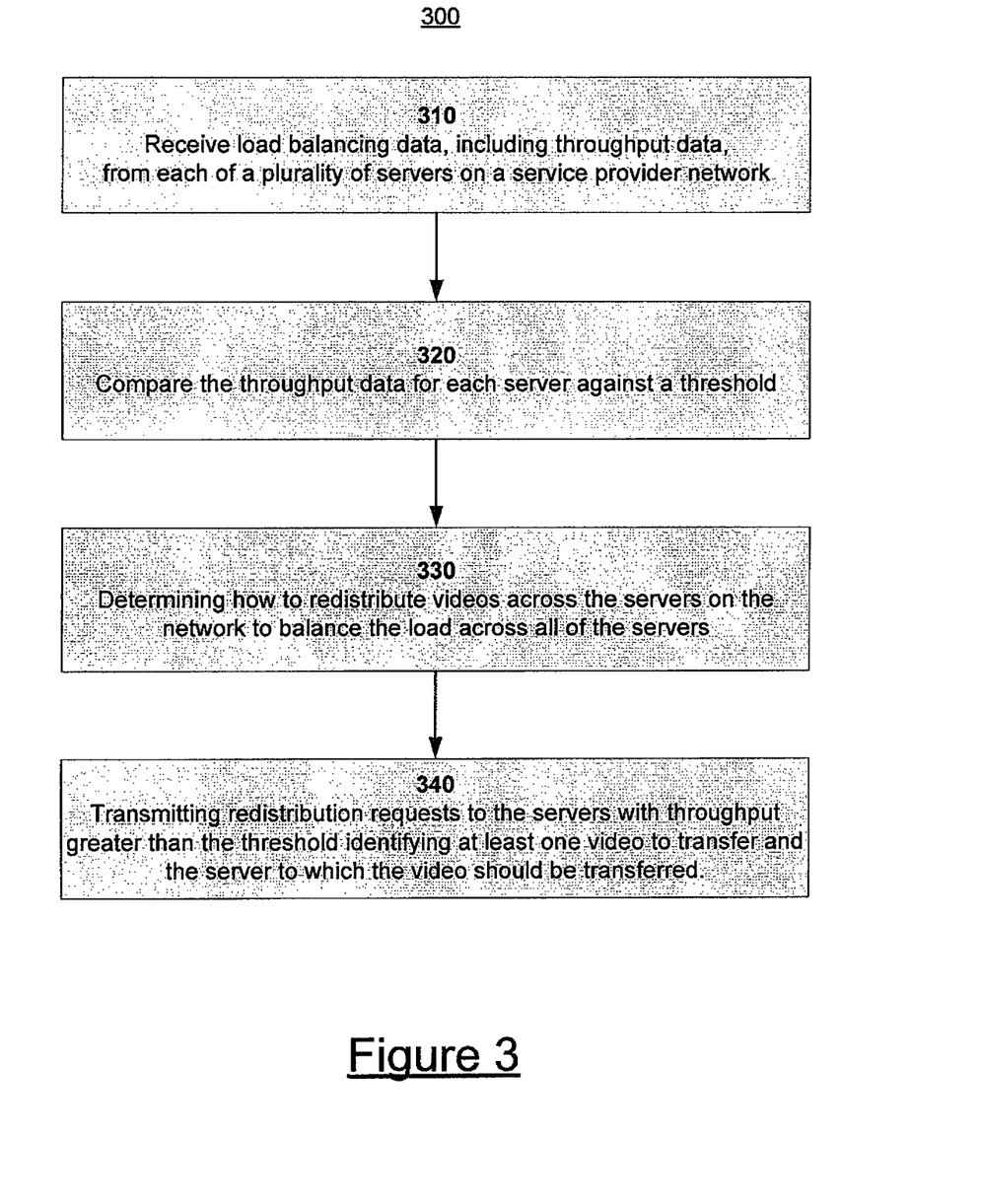
FIG. 3 is a flowchart of a method for redistributing videos across the service provider network according to one embodiment of the invention.

At the end of each ATQ, the servers of the service provider network enter an adjustment cycle to determine how the load of the various servers should be redistributed across the service provider network. FIG. 3 is a flowchart illustrating a method for determining how to balance the load across multiple servers streaming video content according to one embodiment of the invention. In step 310, a master server receives load balancing data from each of the servers on the server provider network 130. Each server transmits the load balancing data at the beginning of an adjustment cycle. One skilled in the art will recognize that an adjustment cycle may take place over any interval of time specified by the service provider. In one embodiment, the load balancing data for a server comprises the overall throughput data of the server and the file size for each video stored on the server and the number of times the server distributed the video since the previous adjustment cycle.

In step 320, the master server compares the overall throughput of each server against a threshold value. In one example, the threshold value may be the average overall throughput across all of the servers in the service provider network 130. The master server analyzes the amount by which the throughput of each server is above or below the threshold and determines 330 how to redistribute videos across the servers on the service provider network to balance the load. In one embodiment, for each server whose overall throughput exceeds the threshold, the master server may look at the amount by which the server's throughput exceeds the threshold and analyze the file sizes and number of distributions of each video since the previous adjustment cycle to determine which videos may be redistributed to other servers to bring the servers load closer to the threshold. For example, the server may identify one or more videos that utilized resources of the server approximate to the amount of throughput which the server exceeds the threshold.

The master server may also identify one or more servers, whose overall throughput is below the threshold value, capable of receiving the videos and thus relieving the load on the overburdened servers. Based on the analysis, the master server determines for each server which videos should be redistributed and identifies a target server for each video to be redistributed. In step 340, the master server transmits redistribution requests to each of the servers whose overall throughput exceeded the threshold. The redistribution request identifies at least one video to transfer and the target server to which the video should be transferred.

In one embodiment, responsive to receiving a redistribution request, the server transfers the video to the target server.

When redistributing videos across the service provider network, the server(s) storing a given video may vary over time. In one embodiment, responsive to the transfer of a video as the result of the redistribution request, the video lookup table 850 is updated to reflect the new server or servers that store the transferred video. For example, the server from which the video was transferred is removed from the table entry associated with the transferred video and the server to which the video was transferred is added to the entry for the video in the table.

In another embodiment of the invention, videos may be redistributed within the service provider network 130 to optimize between the quality of the download and the cost of bandwidth. For example, some servers or clusters within the service provider network may provide better performance to the user at a greater cost to the service provider. While other servers or clusters may provide a noticeably poorer performance to the user but at a lower cost to the service provider.

As discussed previously, the service provider network 130 may be comprised of servers located at different physical locations throughout the world. These servers may be owned and operated by the service provider or leased from a third party who owns the servers and manages the physical location of the servers. The streaming performance may vary greatly between these servers with some servers providing better performance that is noticeable to the end user viewing the requested video.

The performance of the servers that make up the service provider network may be taken into consideration when determining how videos should be distributed across the network. In one embodiment, the most popular videos or most bandwidth intensive videos are transferred to the servers or server cluster that offers the best performance to the user while less popular videos are transferred to servers or clusters that offer poorer performance. This improves the user experience and ensures that the most users are receiving good performance from the service provider network for their requested videos.

For example, the server clusters that make up the service provider network 130 illustrated in FIG. 2 may be comprised of three different server clusters. Server cluster 2 may be a content delivery network (CDN) operated by a third party. A CDN is an intelligent distributed network designed to stream content to a large number of users more reliably, with less buffering. In an embodiment, the service provider leases bandwidth from the CDN and transfers the most bandwidth intensive videos to the CDN for streaming to users. The CDNs stream the videos to users on a fee-for-service basis. Leasing bandwidth from a CDN allows the service provider to utilize the resources available in the CDN network without incurring the large cost and management associated with running large distributed networks throughout the world.

Server cluster 3 may be a managed hosting server cluster operated by a third party hosting company. Managed hosting server clusters are typically comprised of standard servers that are leased to users. These clusters are typically not built up to the same extent as CDN network and not designed specifically to stream content such as video content. As a result, managed hosting sites typically do not provide the same performance as a CDN network.

Server cluster 1 may be a server cluster comprising a collection of servers owned and operated by the service provider. Assume for purposes of this example, that the performance provided by the server cluster 1 is greater than the managed hosting cluster 3 but less than the performance of the CDN cluster 1.

In one embodiment, the service provider network may identify the most frequently viewed videos and transfer them to the CDN for streaming to users. For example, during an adjustment cycle, a master server may identify the most popular or bandwidth intensive videos and redistribute those videos to the CDN cluster 1. This improves the overall performance of the service provider network 130 by offloading the videos that require the most bandwidth to the server cluster with the most resources for handling large bandwidths. It also provides the most users with a good experience when streaming their requested videos.

Similarly, the master server may identify the least popular videos requested from the service provider network and transfer them to the cluster with the poorest performance, in this case, the managed hosting cluster 3. Since the managed hosting cluster 3 streams the least popular videos, its poorer performance will be limited to the fewest users. The remaining videos may be distributed to server cluster 1, which provides a middle level of performance.

In another embodiment, a video that is more relevant to a specific geographic region or requested more frequently by users from that region may be redistributed to the server cluster that is closest in proximity to the geographic location. For example, a video that is more relevant to users in Europe than to users in the US may be redistributed from a cluster in the US to a cluster located in Europe.

While the present invention has been described with reference to certain embodiments, those skilled in the art will recognize that the invention is not limited to the specific embodiments discussed. For example, although the invention was described with respect to streaming videos, one skilled in the art will recognize that many aspects of the invention are applicable to other access methods, including downloading of the entire video to the user's computer rather than streaming. Variations upon and modifications to the embodiments are provided for by the present invention.

The above description is not to be taken in the limiting sense, as it provides examples implementations of embodiments of the present invention.

What is claimed is:

1. A method for leveling requests for serving digital content over a network across a plurality of servers, the method comprising:
   receiving, by a computer, a plurality of digital video content items;
   storing each digital video content item on a storage medium associated with at least one of the plurality of servers;
   during a measurement time, receiving, by a computer, requests for the digital video content items;
   during the measurement time, serving each digital content item in response to a request, the digital content item served by one of the servers having the digital video content item stored on an associated storage medium;
   receiving, by a master server, load balancing data from each of the plurality of servers, the load balancing data including throughput data for each server, a file size for each digital content item, and a number of times the digital content item was served by the server during the measurement time;
   comparing, by the master server, the received throughput data from each of the plurality of servers against a threshold value;
   responsive to the received throughput data for a first of the plurality of servers exceeding the threshold value, moving at least one digital video content item from the first server to a second of the plurality of servers, the second of the plurality of servers having lower throughput during the measurement time than the first of the plurality of servers; and
   during a second measurement time, serving the digital video content item by the second of the plurality of servers in response to a request received during the second measurement time.

2. The method of claim 1, wherein each of the plurality of digital video content items has a first format including one or more of MPEG4, WMV, or Motion PEG.

3. The method of claim 2, wherein each of the digital video content items is decoded from the first format into raw video data and then re-encoded from the raw video data into a new video format.

4. The method of claim 2, wherein each of the digital video content items is transcoded from the first format directly into a streaming format.

5. The method of claim 1, wherein at least one of the plurality of digital video content items is a video received from a user who uploads the video via a web site.

6. A system for serving digital content over a network, the system comprising:
   a plurality of servers, each server having an associated digital storage medium;
   a first computer, adapted to receive a plurality of digital video content items and to cause the received items to be stored by at least one of the plurality of servers;
   a second computer, adapted to receive, during a measurement time, requests for the digital video content items, and to forward each received request to one of the plurality of servers storing the video content item;
   a master server, adapted to:
      receive load balancing data from each of the plurality of servers, the load balancing data including throughput data for each server, a file size for each digital content item, and a number of times the digital content item was served by the server during the measurement time;
      compare the received throughput data from each of the plurality of servers against a threshold value; and to
      direct a first of the plurality of servers to move at least one digital video content item to a second of the plurality of servers responsive to the throughput data from the first server exceeding the threshold value, the second of the plurality of servers having lower throughput during the measurement time than the first of the plurality of servers.

7. The system of claim 6 wherein the threshold value is an average of throughput data received from each of the plurality of servers.

8. The system of claim 6 wherein the at least one digital content item is selected by comparing its file size and the number of times it was served during the measurement time with an amount by which the received throughput data exceeds the threshold value.

9. The method of claim 1 wherein the threshold value is an average of throughput data received from each of the plurality of servers.

10. The method of claim 1 wherein the at least one digital content item is selected by comparing its file size and the number of times it was served during the measurement time with an amount by which the received throughput data exceeds the threshold value.

* * * * *